(12) United States Patent
Koh et al.

(10) Patent No.: US 6,992,748 B2
(45) Date of Patent: Jan. 31, 2006

(54) SCALABLE AND MASS-MANUFACTURABLE OXC USING LIQUID CRYSTAL CELLS

(75) Inventors: Seungug Koh, Sunnyvale, CA (US); Sadeg M. Faris, Pleasantville, NY (US)

(73) Assignee: Reveo, Inc., Elmsford, NY (US)

( * ) Notice: Subject to any disclaimer, the term of this patent is extended or adjusted under 35 U.S.C. 154(b) by 0 days.

(21) Appl. No.: 10/458,758

(22) Filed: Jun. 10, 2003

(65) Prior Publication Data

US 2004/0042708 A1   Mar. 4, 2004

Related U.S. Application Data

(60) Provisional application No. 60/387,355, filed on Jun. 10, 2002.

(51) Int. Cl.
*G02F 1/13* (2006.01)
(52) U.S. Cl. ..................................................... 349/196
(58) Field of Classification Search ................ 349/196; 359/495
See application file for complete search history.

(56) References Cited

U.S. PATENT DOCUMENTS

| | | | |
|---|---|---|---|
| 5,477,350 A | 12/1995 | Rizz et al. | 359/250 |
| 6,134,358 A | 10/2000 | Wu et al. | 385/16 |
| 6,337,934 B1 | 1/2002 | Wu et al. | 385/16 |
| 6,404,550 B1 * | 6/2002 | Yajima | 359/487 |

* cited by examiner

*Primary Examiner*—James A. Dudek
(74) *Attorney, Agent, or Firm*—Ralph J. Crispino

(57) ABSTRACT

A 1XN (or NX1) optical connector for steering light is provided, which may be formed into an optical cross connecter. The optical connector generally includes a plurality of N stages, each stage including a liquid crystal cell and a polarizing beam splitter. The liquid crystal cell, in certain embodiments in the form of an array of LC cells, has a first state for transmitting a first polarization component of the light and a second state for transmitting a second polarization component of the light. The polarizing beam splitter structure reflects one of the polarization states and transmits the other polarization state into one of $2^N$ outputs. Of course, the direction of light can be reversed, forming an NX1 cell. A key advantage of the present invention is the integration of components to form a monolithic structure.

3 Claims, 15 Drawing Sheets

SCALABLE AND MASS-MANUFACTURABLE OXC USING LIQUID CRYSTAL CELLS

RELATED APPLICATIONS

The present invention claims priority to U.S. Provisional Patent Applications No. 60/387,355, filed Jun. 10, 2002 which is incorporated by reference herein.

BACKGROUND OF THE INVENTION

1. Field of the Invention

The present invention relates to optical cross-connects, and particularly to scalable and mass-manufacturable OXC systems and components using liquid crystal.

2. Description of the Prior Art

In optical networks, optical fibers are interconnecting a variety of optical network elements (ONE) using a wide range of network configurations. Some of basic ONE include optical cross-connect (OXC), optical add/drop multiplexer (OADM), and optical terminal multiplexer (OTM).

The OXC is an essential ONE to construct general mesh or ring networks, while the OADM and OTM are useful for ring and linear networks. OXC can be classified as fiber cross-connect (FXC), wavelength selective cross-connect (WSXC), wavelength interchange cross-connect (WIXC), and hybrid OXC. This classification is based on the ability/inability to cross-connect on a per wavelength basis and the level of wavelength conversion provided. FXC is a simplest form of OXC, while WSXC and WIXC are becoming increasingly complex by delivering additional functionality.

FXC delivers a multiport fiber switching to enable cross-connection of multiwavelength optical signals as a group without demultiplexing individual signals. For FXC, there is no requirement for single channel add/drop, regeneration, optical amplification, performance monitoring, protection switching, DWDM signal grooming, and communication protocol support & routing, while WSXC and WIXC requires all of these functions. Additionally, WIXC requires a wavelength interchange function.

Hybrid OXC is based on combining any of FXC, WSXC, or WIXC functionalities. All of these OXCs desirably should support configuration management, fault management, and security management functions. Essential criteria on evaluating OXC are: (1) port counts, (2) device scalability, (3) blocking characteristics, (4) cost, (5) footprint size, (6) power consumption, (7) insertion loss, (8) uniformity, and (9) other optical performance parameters.

While OXC is an integral optical network element (ONE) for reconfigurable optical networks, the building blocks for known OXC include numerous photonic & electronic components such as single-mode fiber optic switch, DWDM mux/demux filter, wavelength converters, optical amplifiers, optical performance monitors, optical transponders, and OXC controllers. Optical performance parameters for reliable and compatible operation of single-mode fiber optic switches include optical passband, insertion loss, uniformity, wavelength flatness, control stability, repeatability, polarization dependent loss, crosstalk, directivity, return loss, differential group delay, maximum allowable optical power, and switching time. The optical passband parameter classifies the fiber optic switches into single band (covering either 1260 nm to 1360 nm OR 1480 nm to 1580 nm), dual band (covering both bands), or wideband (covering 1260 nm to 1580 nm).

Reliability is also a primary concern, including mechanical integrity, endurance, and special test procedures. Mechanical integrity requirements may include ability to withstand mechanical shock, vibration, thermal shock, solderability, and fiber integrity. The endurance requirements are for dry high-temperature storage, damp high-temperature storage or damp heat (hermetic), damp high-temperature storage or damp heat (non-hermetic), low-temperature storage, temperature cycling, and cyclic moisture resistance. Special tests may include inter moisture and electrostatic discharge (ESD) tests.

The OXC can reconfigure the optical network dynamically by interconnecting arbitrary input ports to any designated output ports. There exist a variety of non-blocking cross-connect network architectures, such as cross-bar network, Spanke network, Clos network, and Benes network. The cross-bar, Spanake, and Clos networks can be classified as fully non-blocking networks, while the Benes network is a rearrangeably non-blocking network. The fully non-blocking cross-connect architecture represents a network, where any unused input port can be connected to any unused output port without disrupting the existing interconnects within the network. In contrast, the rearrangeably non-blocking network may require the existing interconnects to be broken down and rearranged in order to accommodate new interconnects among unused input and output ports.

The Spanke network provides the desirable fully non-blocking characteristics and it is composed of three distinctive stages: 1) N arrays of 1×N switches, 2) $N^2$ cross-connect network, and 3) N arrays of N×1 switches. The $N^2$ cross-connect network staged at the middle is passive but massively parallel cross-point interconnects, wherein the $N^2$ output ports from N arrays of 1×N switches interface the $N^2$ input ports for N arrays of N×1 switches. The Spanke network is known to be capable of furnishing small signal crosstalks and simple control algorithms to the OXC. However, the known drawback of this architecture is an excessively large $N^2$ cross-connect network at the middle stage, especially when the port-count N becomes very large. Nevertheless, FIG. 1 shows that any input port can be routed to any output port in a fully non-blocking manner in a Spanke network.

SUMMARY OF THE INVENTION

The above-discussed and other problems and deficiencies of the prior art are overcome or alleviated by the several methods and apparatus of the present invention for a 1XN (or NX1) optical connector for steering light. The optical connector generally includes a plurality of N stages, each stage including a liquid crystal cell and a polarizing beam splitter. The liquid crystal cell, in certain embodiments in the form of an array of LC cells, has a first state for transmitting a first polarization component of the light and a second state for transmitting a second polarization component of the light. The polarizing beam splitter structure reflects one of the polarization states and transmits the other polarization state into one of $2^N$ outputs. Of course, the direction of light can be reversed, forming an NX1 cell. A key advantage of the present invention is the integration of components to form a monolithic structure.

The above-discussed and other features and advantages of the present invention will be appreciated and understood by those skilled in the art from the following detailed description and drawings.

DETAILED DESCRIPTION OF THE ILLUSTRATIVE EMBODIMENTS

Herein disclosed is a method for manufacturing OXC systems and system components. For example, in one embedment, the disclosed invention implements OXC by using Spanke network and it combines liquid crystal cells and polarization optics to allow scalable architecture and mass-manufacturable device structure for OXC.

Figure 1:
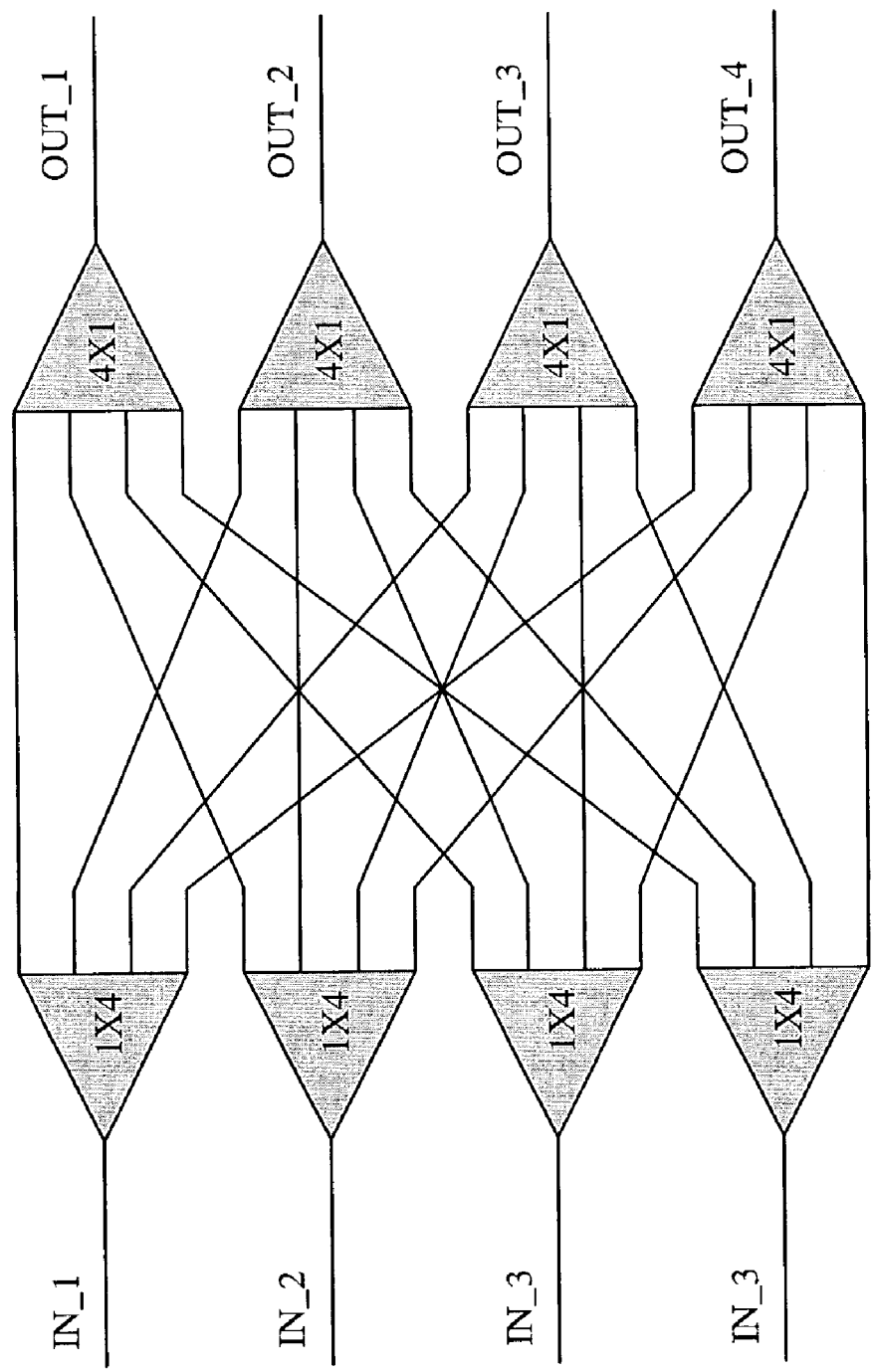
FIG. 1 illustrates a Spanke network.
Figure 2A:
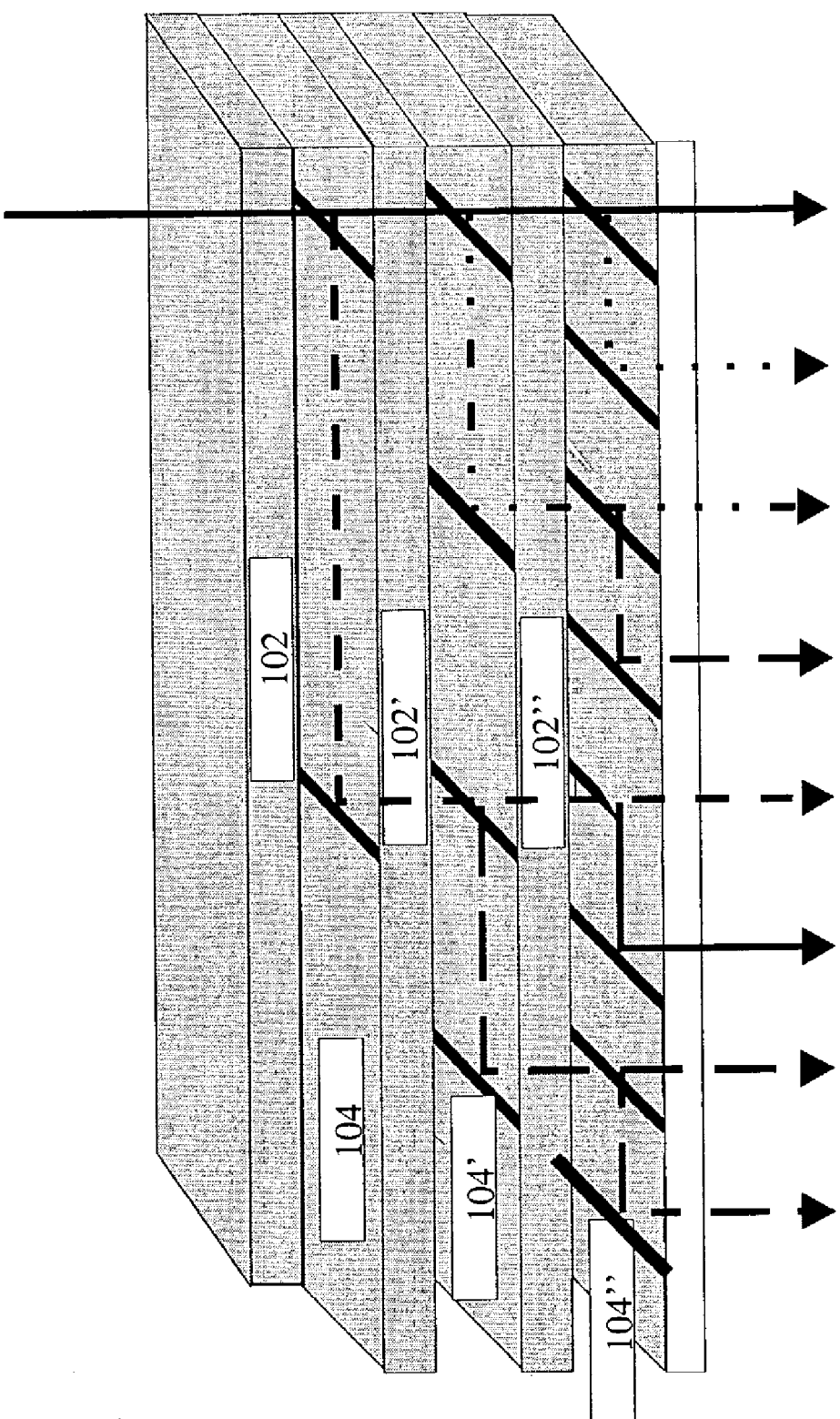
FIG. 2A illustrates a part of the OXC structure.

Referring now to FIG. 2A, a general embodiment of a portion of a device structure 100 that may form part of the OXC structure described herein. As shown, the device structure 100, a beam steering device, is a 1×8 beam steering device, however it is intended that the scale may be enlarged tremendously. Further, as described herein, two-dimensional beam steering devices can be fabricated by overlapping several one-dimensional beam steering devices perpendicularly.

The device structure 100 generally includes alternating layers of phase shifter 102, polarization beam splitter (first level) 104, phase shifter 102', polarization beam splitter (second level) 104', phase shifter 102", and polarization beam splitter (third level) 104'". Note that there are $2^N$ outputs, wherein N is the number of levels.

The benefits of such a structure include the ability to attain high performance with simple control electronics. Such a structure can be fabricated to maintain excellent reliability and low cost due to its use of integrated solid-state optical switches. Further, its monolithic design allows the OXC to be readily scalable and mass-manufacturable. The OXC also has a fully nonblocking architecture. The OXC is also insensitive to shock and vibrations as there is no moving parts. Further, there is no inter-stage fiber cross-connects, also contributing to potentially lower cost compared to other OXCs.

Figure 2B:
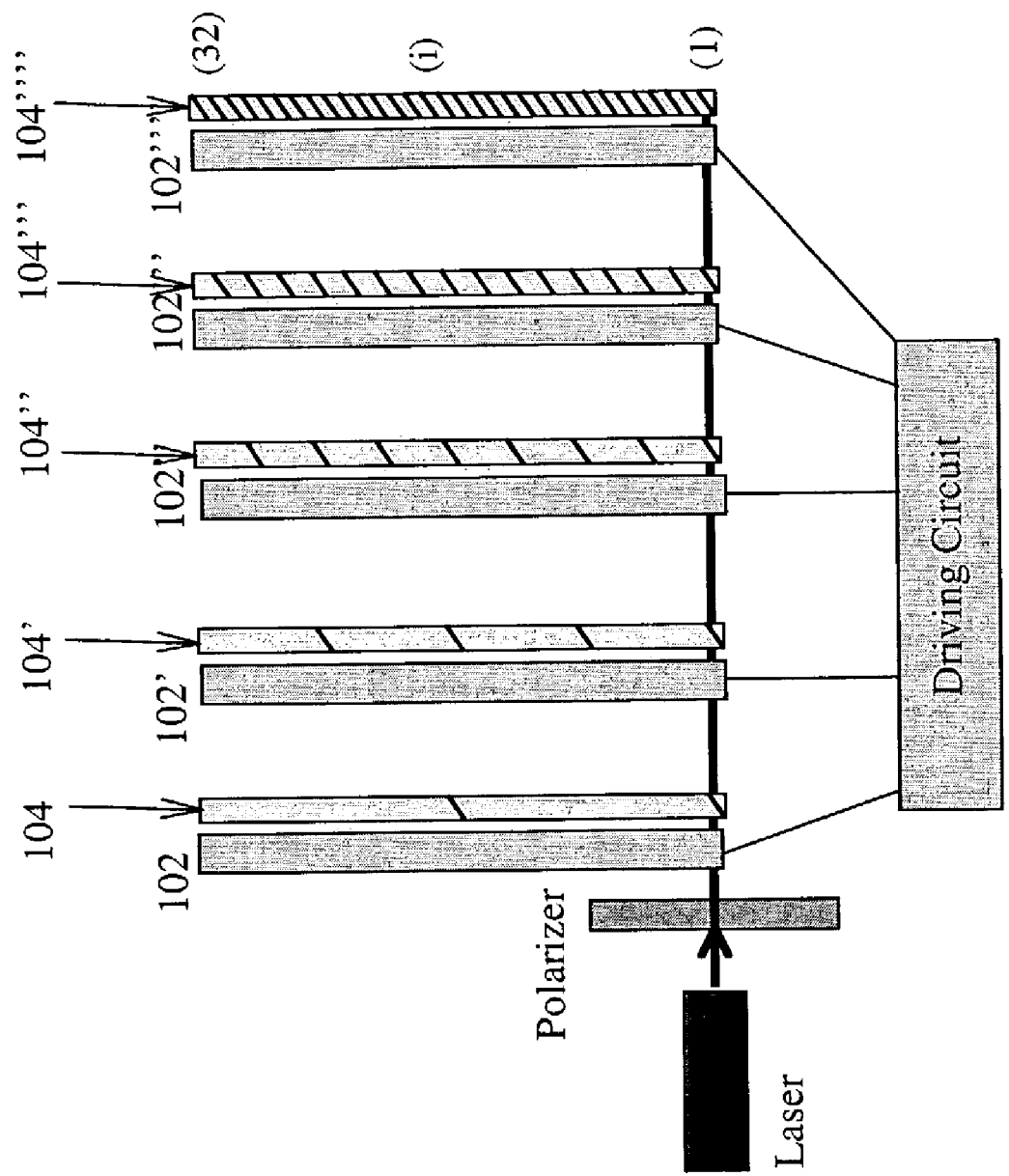
FIG. 2B shows an OXC structure of the present invention and associated driving systems.

As shown in FIG. 2B, an OXC includes alternating layers of phase shifter 102, polarization beam splitter (first level) 104, phase shifter 102', polarization beam splitter (second level) 104', phase shifter 102", polarization beam splitter (third level) 104", phase shifter 102'", polarization beam splitter (fourth level) 104'", phase shifter 102"", and polarization beam splitter (fourth level) 104"". A laser optic source (e.g., a He-Ne laser) is coupled, through a polarizer, to the first stage including liquid crystal cell 102 and polarization beam splitter 104. Driving circuitry is included to control the on/off or attenuation of each liquid crystal cell 102 et. seq.

Figure 3A:
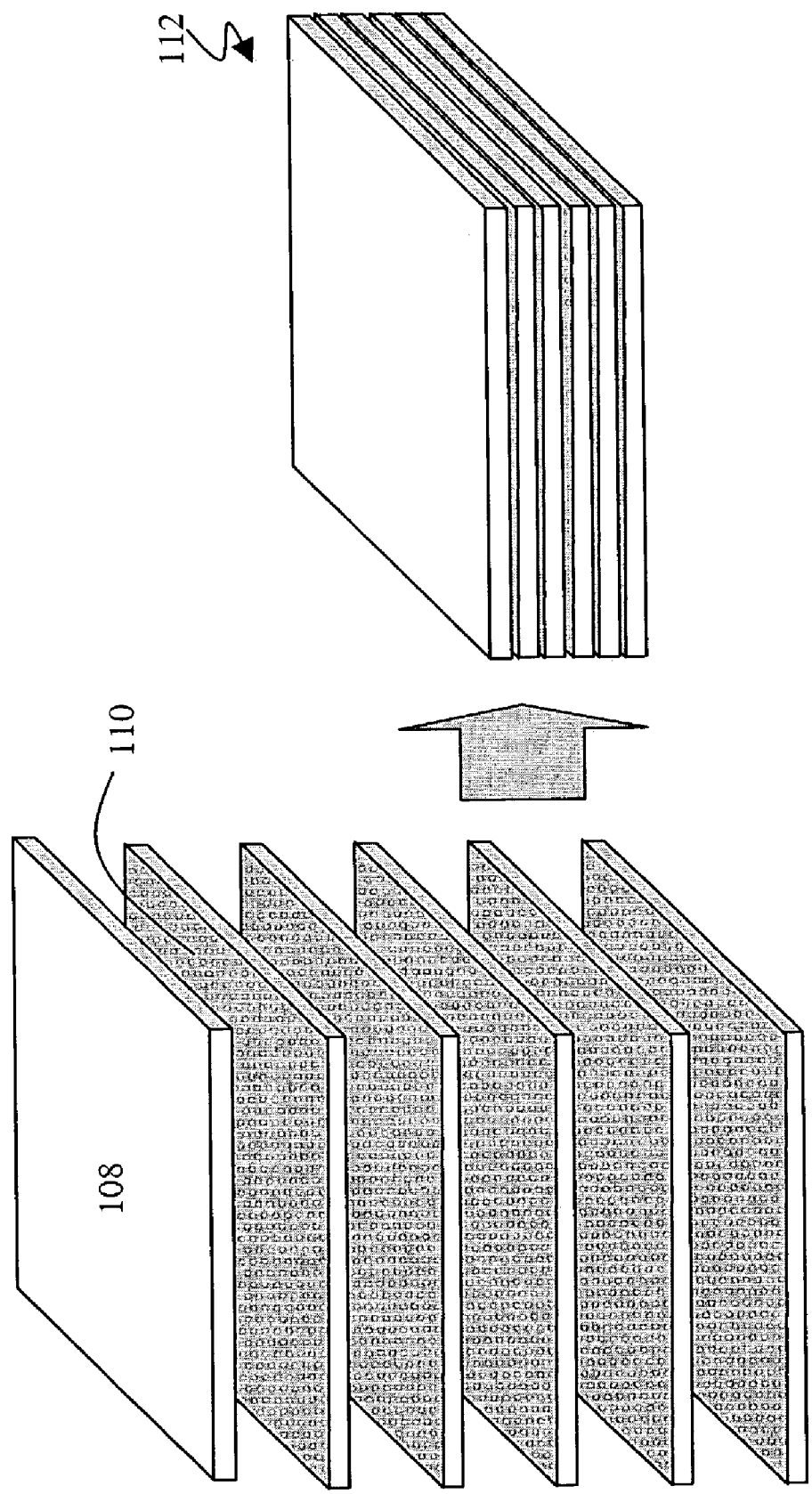
FIGS. 3A and 3B illustrate stack and slice process steps for forming a polarization beam splitter array.
Figure 3B:
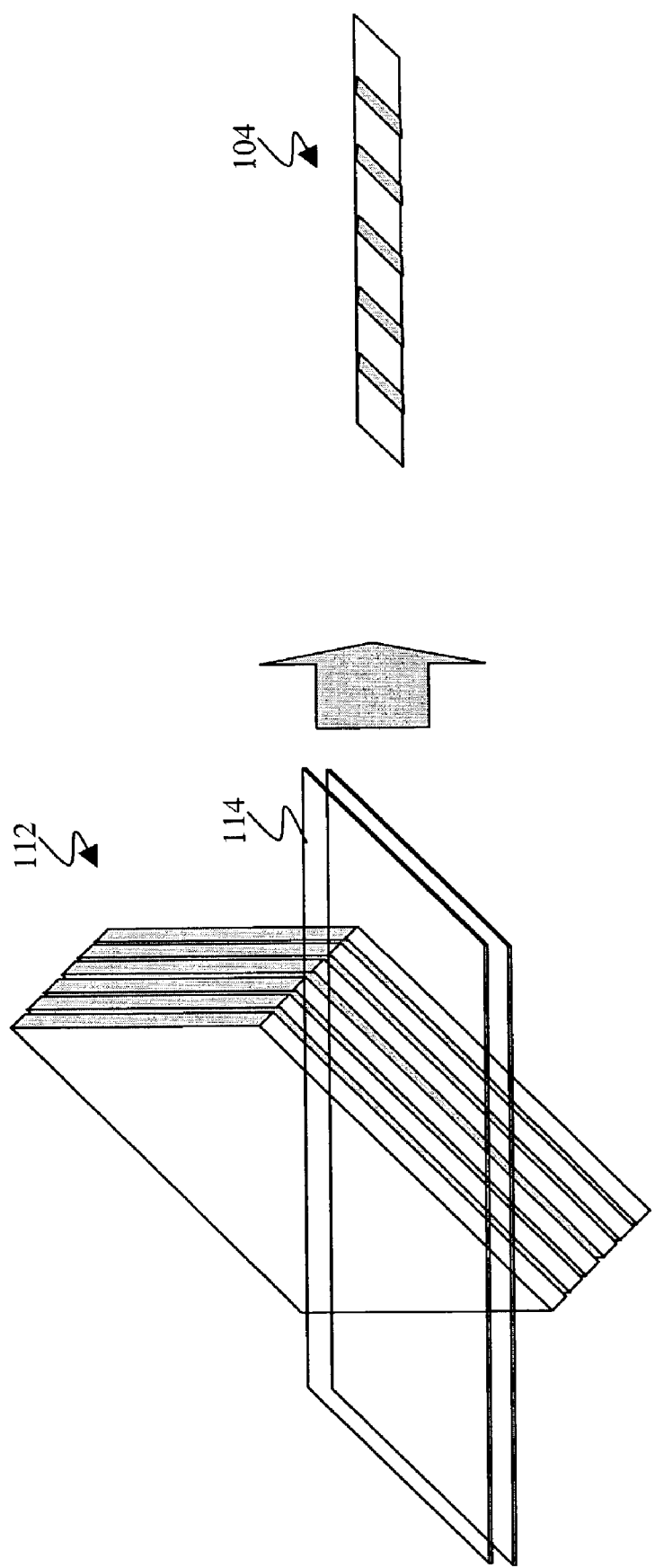

A stack & slice fabrication process is illustrated in FIGS. 3A and 3B to implement a monolithically integrated polarization beam splitter (PBS) window to integrate in 1×N and N×1 optical switch arrays. Plates of insulating material, such as glass, $SiO_2$, polycarbonate, acrylic or any other appropriate optically transparent material are coated with a suitable thin-film coating for polarization beam splitting operation are stacked together to form an integral stack 112 as illustrated in FIG. 3A. For example, the thin film coating may comprise multi-layer dielectric material to impart the desired polarization beam splitting properties. Referring to FIG. 3B, a "slice plane" 114 is defined. If the stack 112 is sliced at 45°, it will result in a planar and monolithically integrated polarizing beam splitting window 102 as shown in FIG. 3B. The number of layers and thickness of each layer for the stack of glass plates can determine the number and pitch of the monolithically integrated polarizing beam splitting array 102.

Figure 4:
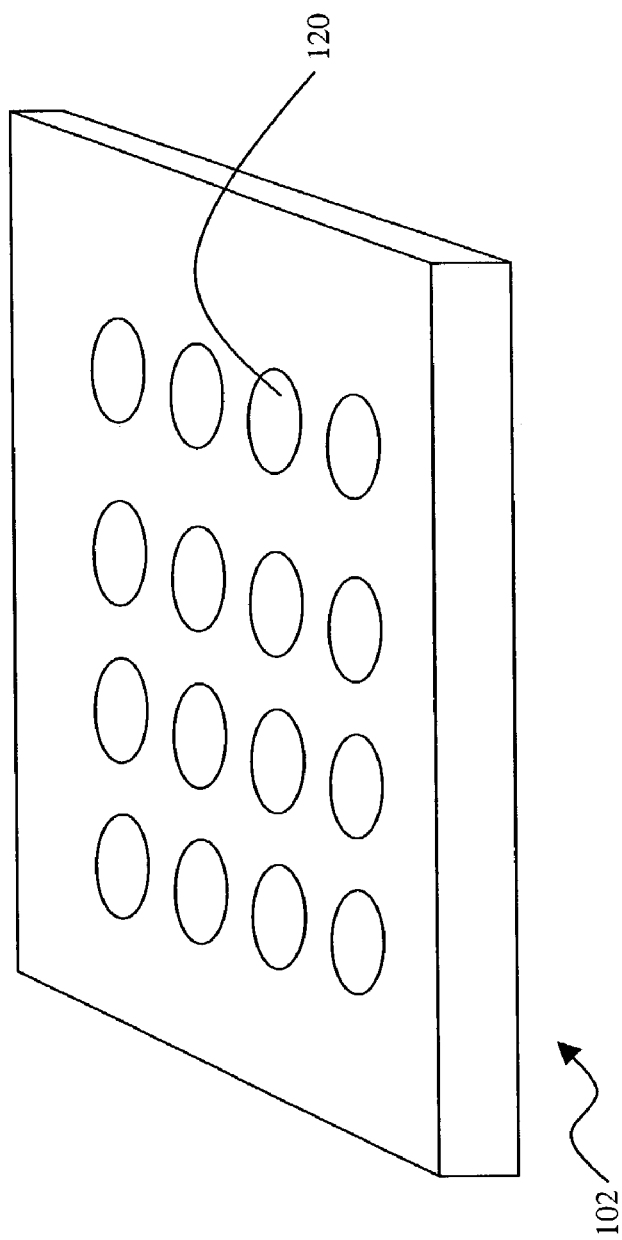
FIG. 4 illustrates a liquid crystal window structure.

Referring now to FIG. 4, a two-dimensional liquid crystal window structure 104 for polarization rotation or optical beam steering operations is depicted. The two-dimensional array structure of liquid crystal windows for polarization rotation or optical beam steering operations are featured as monolithic cells, integrated into an array shape rather than discrete. As is known to those skilled in the art, such cells typically include addressable electrodes. Such cells are not restricted to binary, and may use variable optical attenuation, other phase shifting functions, microprism functionality, microlens functionality, or other desired functionality. The polarization rotation operations from the plural liquid crystal windows 120 can generate a variety of optical functionalities for optical switching, variable optical attenuation, and optical shutter by integrating with other optical devices such as the polarization beam splitter described herein and optionally linear polarizer(s). Coupling of the liquid crystal polarization rotation window 104 and polarization beam splitter 102 can provide optical switching in a two-dimensional array fashion. Optical shutter or VOA operations can also be implemented by combining the liquid crystal polarization window 104 and a linear polarizer window.

Note that although the structure of FIG. 4 illustrates circular liquid crystal windows, it should be understood that any suitable shape may be used. However, circular windows are preferred as they generally match the shape of the optical signal to be routed through the OXC. Alterative liquid crystal window structures may include pixilated liquid crystal cells, e.g., similar to those used within LCD displays, with pixellated electrode structures. Further, at certain stages, and in certain device configurations, pixilated or arrayed structures may not be required, and a single liquid crystal device may be at each level.

Figure 5:
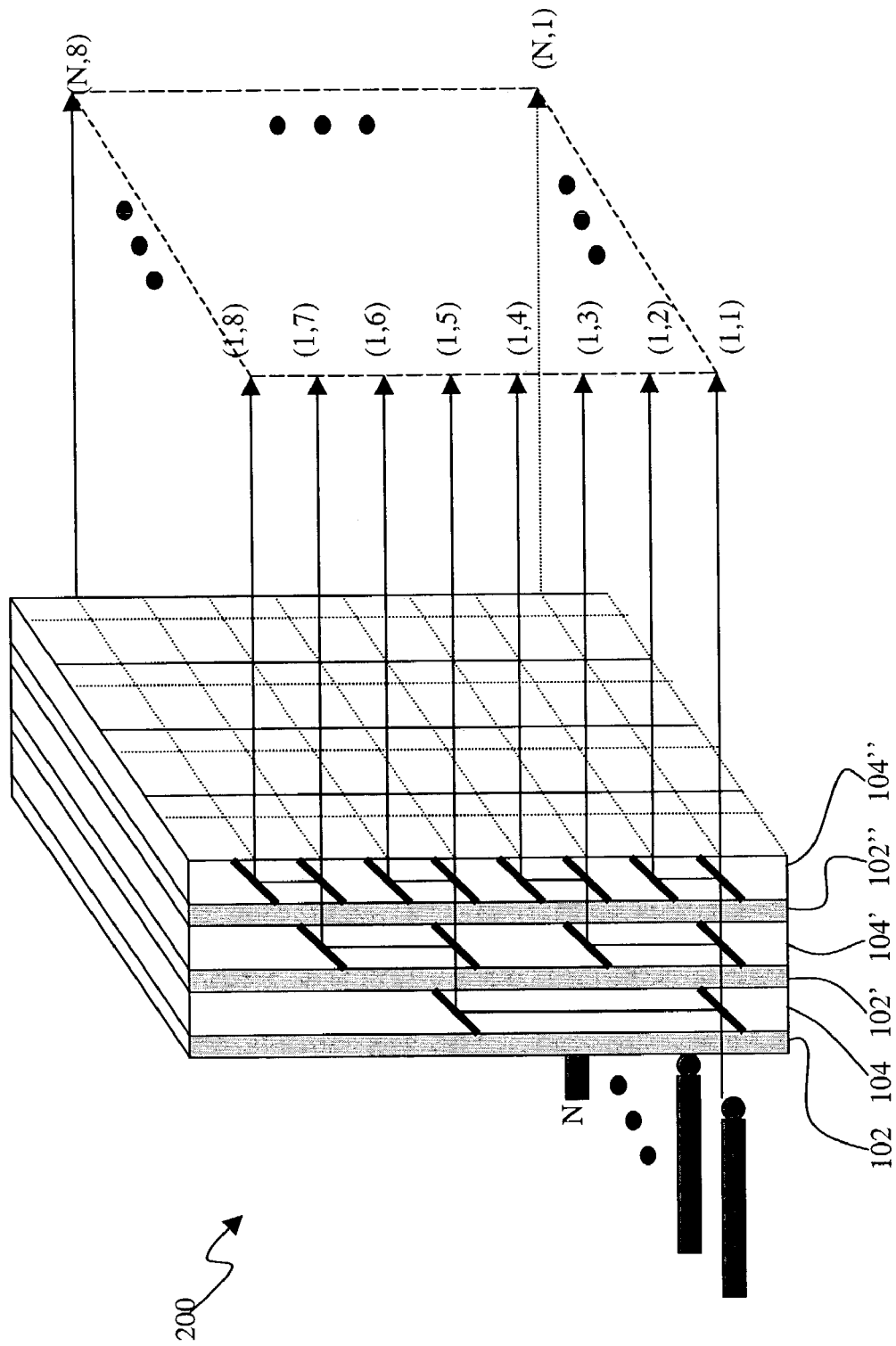
FIG. 5 illustrates an M×N array formed according to the present invention.

An exemplary device structure 200 for N arrays of 1×M optical switches is shown in FIG. 5. In this figure, M is shown as eight, even though more or less may be used. In general, M and N can be any positive integer numbers. Laser beams from an input array of optical fibers (not shown), predominantly single-mode optical fibers, are collimated by using fiber collimators and then coupled into the structure 200. The composite structure 200 includes layers of windows 102, 102' and 102" (imparting LC polarization shift) and monolithic PBS array windows 104, 104' and 104". The first laser beam input at the input port 1 can be directed to any output ports located at first column, e.g. from (1,1) through (1,8) by using LC optical switches. Likewise, other laser beam inputs at the other input ports can be routed to any output ports located at the corresponding column. The columns are defining boundaries for N independent 1×M optical switches. The individual polarization beam splitters in the monolithic polarization beam splitter array windows 104 et seq. behaves as both polarization beam splitter and polarization beam reflector depending on its location. Liquid crystal cells 102 et seq. for imparting polarization shift or polarization rotation are placed in front of polarization beam splitter array windows 104 et seq. order to alter the state of polarization prior to entering the polarization beam splitter cells.

Figure 6:
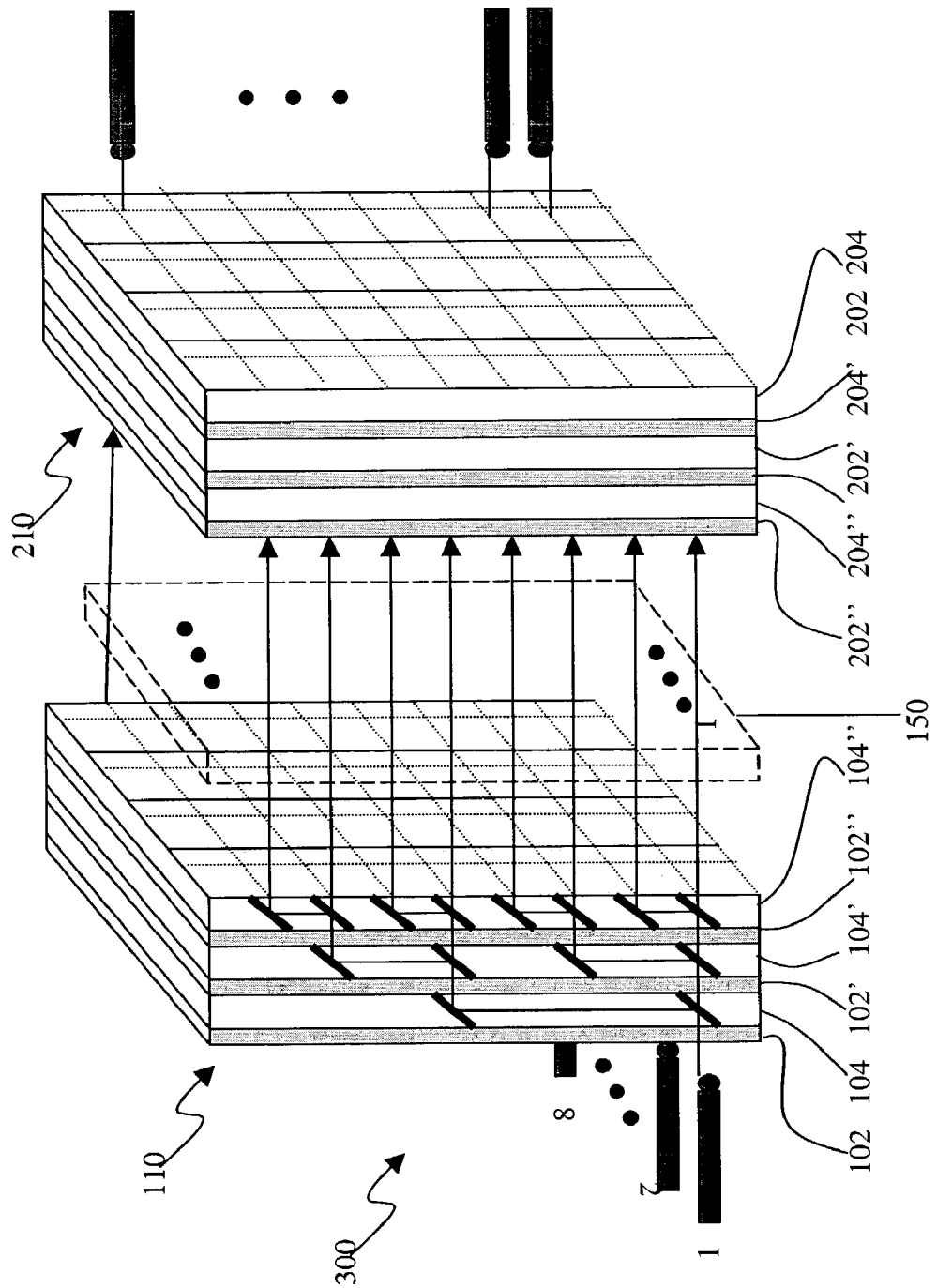
FIG. 6 illustrates an M×N OXC.

An exemplary device structure for N×N optical switches utilizing Spanke network is shown in FIG. 6, which utilizes two stages of N-array 1×N optical switches. The first stage 110 N-arrays of 1×N switches are interconnected to the second stage 210 in free space without using any fiber interconnect or waveguides. The first stage 110 includes, e.g., layers of windows 102, 102' and 102" (imparting LC polarization shift) and monolithic PBS array windows 104, 104' and 104", and the second stage includes orthogonally oriented layers of windows 202", 202' and 202 (imparting LC polarization shift) and monolithic PBS array windows 204", 204' and 204.

The elimination of fiber interconnect stage allows the N×N optical switch to become compact, scalable, low-loss, and low cost. On the second stage 210, N-arrays of N×1 optical switches are rotated at a right angle in order to implement cross-connects optical signals between output ports of 1×N optical switches of stage 110 and input ports of N×1 optical switches of stage 210.

Optionally, an optical conditioning window 150 may be inserted between the two stages as shown in FIG. 6. The optical conditioning window may be an optical shutter window, a variable optical attenuator window, liquid crystal micro prism window, liquid crystal micro lens window, or any combination thereof. Conditioning window 150 optical signal conditioning by adjusting optical power, optical beam shape, or signal propagation angle. The optical shutter window can enhance the extinction ratio of OXC.

By combining the liquid crystal window and polarization beam splitting window, optical signals can be either blocked or passed through the individual cells in the window. Since there is only one active output port for 1×N optical switch, an optical shutter window, e.g., in a conditioning window 150, can be set to a block state except for the active output port to eliminate any leakage optical signals from the inactive output ports. Variable optical attenuator windows may also be included in the conditioning window 150, e.g., a combination of a liquid crystal window and a linear polarizer window to control the optical signal power. Liquid crystal micro lens windows may also be included in the conditioning window 150, e.g., to adjust the shape of optical beam. Liquid crystal micro prism window may also be included in the conditioning window 150, e.g., to modify the propagation direction of optical beam. Multiple elements of optical conditioning window with same kind or different kind can be combined together.

Figure 7B:
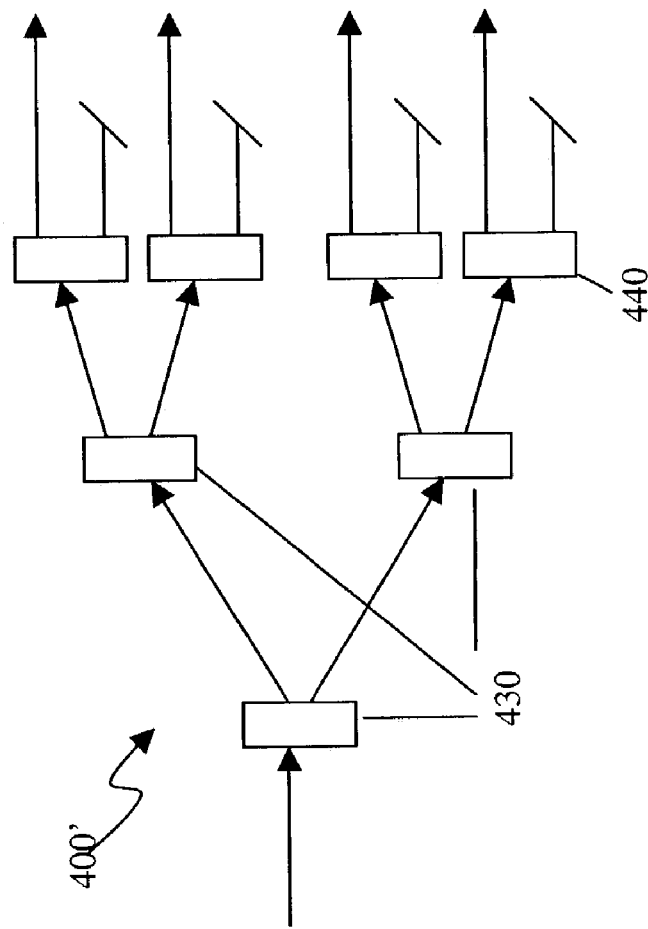
FIGS. 7A and 7B illustrate a method for eliminating extinction ratio detriments.
Figure 7A:
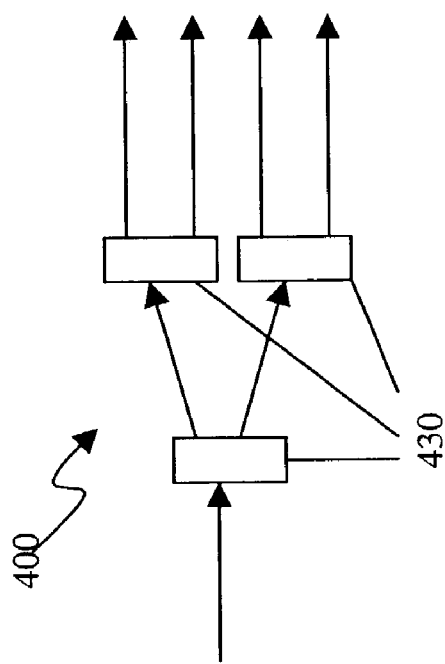
Figure 8:
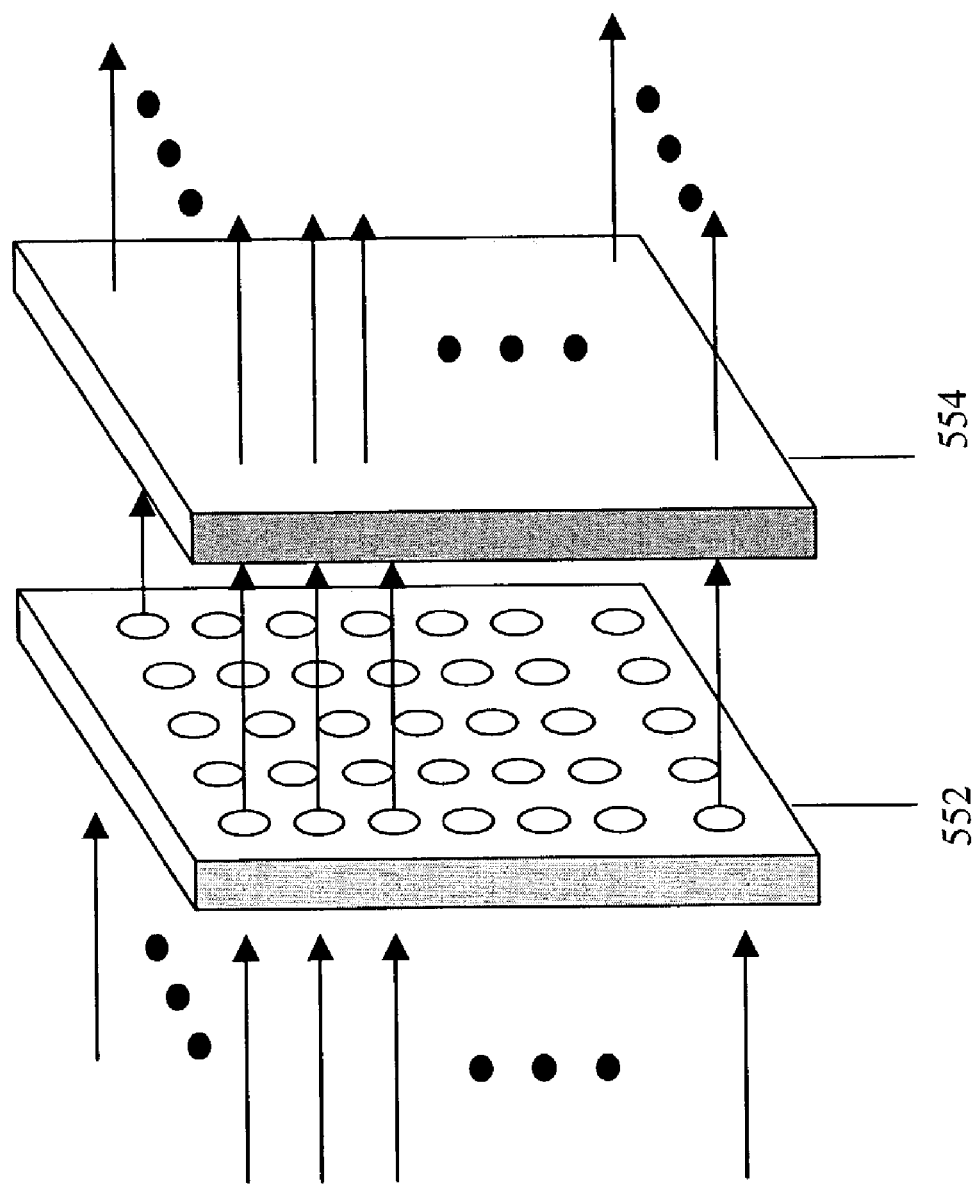
FIG. 8 illustrates an optical shutter or variable optical attenuator.

FIGS. 7A and 7B illustrates a method of improving extinction ratio of 1×N optical switches. Here, a 1×4 optical switch 400 of FIG. 7A is shown with three 1×2 optical switches 430 cascaded together. The overall extinction ratio of 1×4 optical switch depends on the individual 1×2 optical switch performance. Due to non-ideal optical switch performance, it is nearly impossible possible to eliminate optical signals completely at the off-state output ports. However, referring to FIG. 7B, optical shutters 440 are includes at the last stage of the 1×4 optical switch 400' to improve the extinction ratio drastically. The optical shutter 440 at the last stage will block any off-state optical signals at the output ports without blocking the on-state optical signals. The optical shutter and/or variable optical attenuator can be implemented in a 2D array configuration as shown in FIG. 8, by serially interconnecting a liquid crystal polarization rotator window 552 and a linear polarizer window 334. For an optical shutter, the liquid crystal polarization rotator window 552 operates in a binary mode by allowing either on or off states only. For variable optical attenuator operation, the liquid crystal polarization rotator window 552 operates in analog mode by allowing continuous varying polarization states. The multiple stages of an optical shutter window or a variable optical attenuator window can be cascaded in order to increase the extinction ratio or attenuation range.

Variable optical attenuators may be positioned at various locations within the OXC. For example, it may be placed at the input of the 1XN stage, the output of the 1XN stage, or the output of the NX1 stage. At the input of 1XN stage or output of NX1 stage, the variable optical attenuator may be a single device. Dynamic control is desired to provide equalized optical attenuation. In another embodiment, at the output of the 1XN stage, an array of variable optical attenuators may be used corresponding to the number of signal exit windows. This is desirable since the variable optical array may be predetermined during manufacturing or assembly and dynamic control is not required, since each optical cross-connect path is known and may be calibrated.

The position of the optical shutter may also vary. In preferred embodiments, the optical shutter is used at the output of the 1XN stage. However, it may be used in any other suitable position depending on the desired system control levels and complexity.

To provide larger dynamic range, a combination of conditioning windows including variable optical attenuators and/or optical shutters may be provided.

Figure 10:
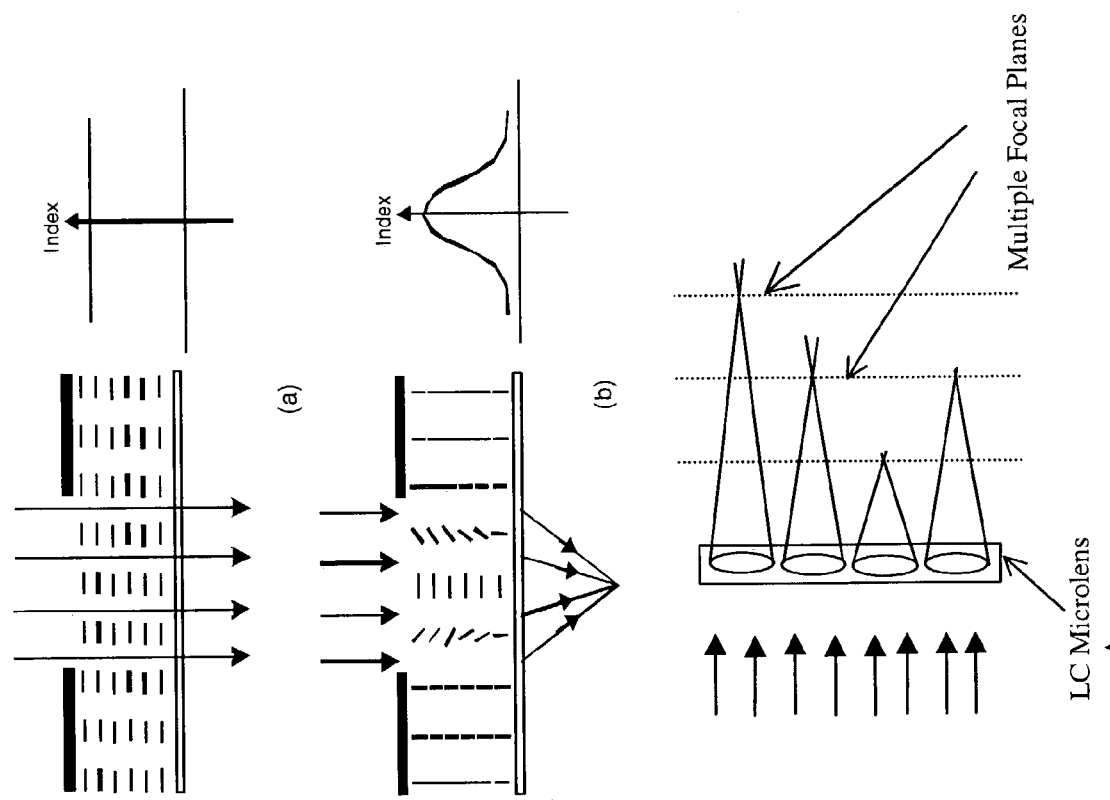
FIG. 10 illustrates operation of a microlens.
Figure 9:
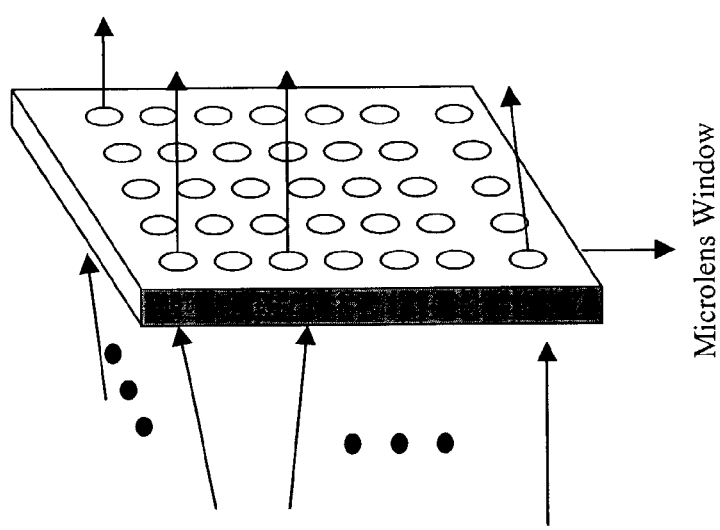
FIG. 9 illustrates a microlens array.

FIG. 9 shows a 2-D beam steering window using liquid crystal microlenses. It is known that variable focus microlens array can be implemented by using liquid crystal, the operation of which is shown, for example, in FIG. 10. The variable electrical potential applied to liquid crystal cell can induce a particular refractive index profile, which can function as an optical lens. The optical microlens array can provide a flexible beam steering capability necessary for the OXC, since the focal length can be dynamically adjusted by simply changing the electrical potential.

Microlenses may be positioned at various locations within the OXC. For example, it may be placed at the input of the 1XN stage, the output of the 1XN stage, or the output of the NX1 stage. At the input of 1XN stage or output of NX1 stage, the microlens may be a single microlens coupled to the input/output beam window position. Dynamic control is desired to provide equalized optical attenuation. In another embodiment, at the output of the 1XN stage, an array of microlenses may be used corresponding to the number of signal exit windows. This is desirable since the microlenses and focal length may be predetermined during manufacturing or assembly and dynamic control is not required, since each optical cross-connect path is known and may be calibrated.

Figure 11:
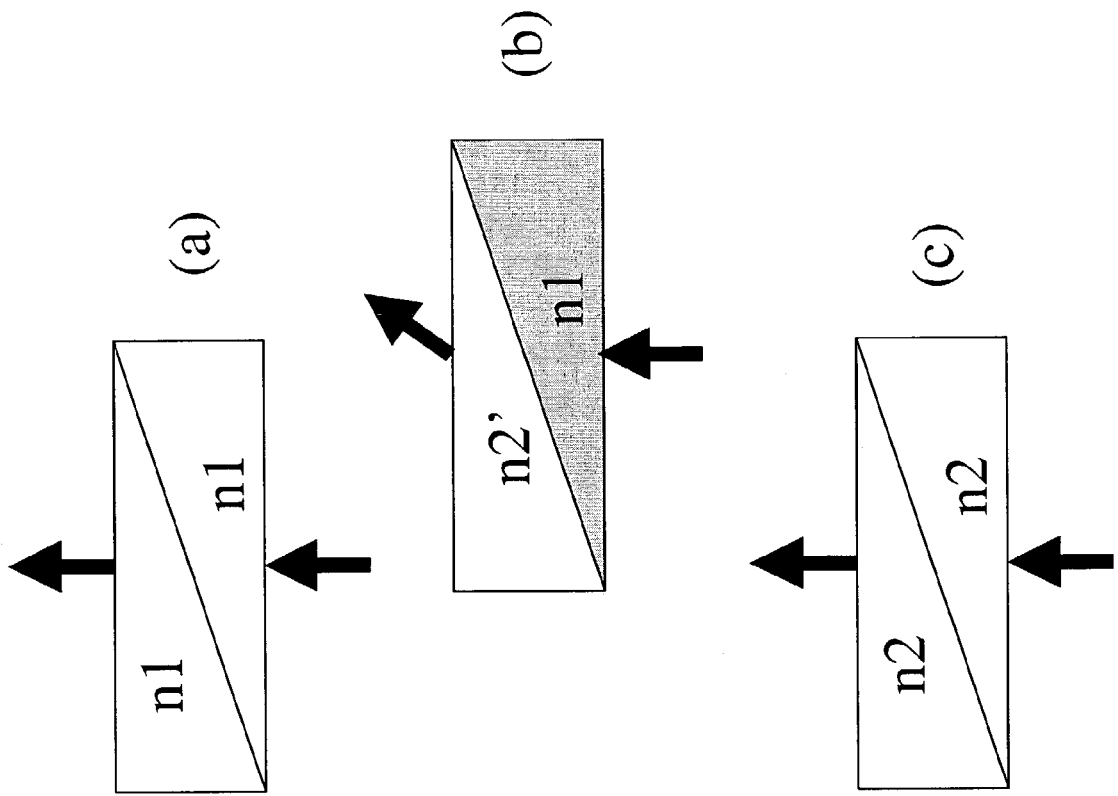
FIG. 11 illustrates operation of a microprism structure.
Figure 11:
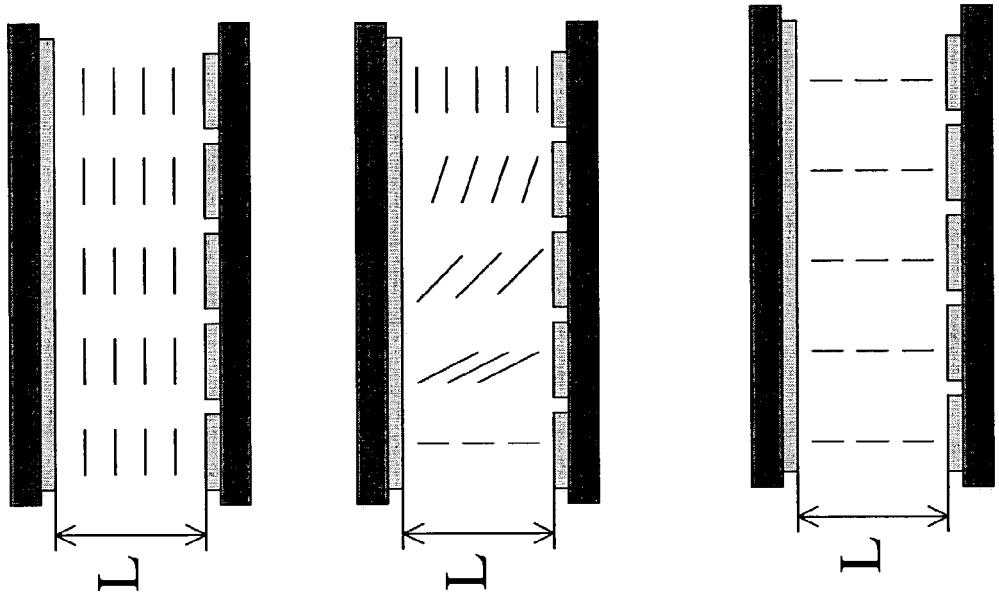

Another beam steering device for the OXC using liquid crystal is a liquid crystal micro prism as shown in FIG. 11. The differential electrical potential applied to liquid crystal cell electrodes can rotate the liquid crystal cell directors with a varying degree of rotation angle. Subsequently the distributed director orientation as shown in FIG. 11(b) can provide a refractive index profile of prism to influence the propagation direction of optical signals. Note that the optical signal deflection can be continuously adjusted by changing the refractive index profile, which is set by the electrical potential. If liquid crystal micro prisms are included inside the OXC stages, it can dynamically adjust the optical beam propagation direction to point optical beams accurately and to improve optical signal coupling efficiency between the fiber collimators.

Micro prisms may be positioned at various locations within the OXC. For example, they may be placed at the input of the 1XN stage, the output of the 1XN stage, or the output of the NX1 stage. At the input of 1XN stage or output of NX1 stage, the micro prism may be a single micro prism coupled to the input/output beam window position. Dynamic control is desired to provide equalized optical attenuation. In another embodiment, at the output of the 1XN stage, an array of micro prisms may be used corresponding to the number of signal exit windows. This is desirable since the micro prisms and signal deflection direction and magnitude may be predetermined during manufacturing or assembly and dynamic control is minimally required, since each optical cross-connect path is known and may be calibrated.

By cascading two stages of liquid crystal micro prism windows, it is also possible to provide a comprehensive modification of signal propagation angle in both X and Y directions. For example, the first stage can modify the signal propagation angle for X-direction, while the second stage does the same for Y-direction. Note that the input optical signal's polarization axis should be rotated about 90 degrees between two stages of liquid crystal micro prism windows, since these are polarization sensitive. The liquid crystal cell's micro prism effect disappears when it reaches either homogeneous liquid crystal orientation of FIG. 11(a) or homeotropic liquid crystal orientation of FIG. 11(c). The multiple electrical electrodes on the liquid crystal cell can facilitate a precise control of liquid crystal director orientations for accurate adjustment of optical beam deflection.

Figure 12:
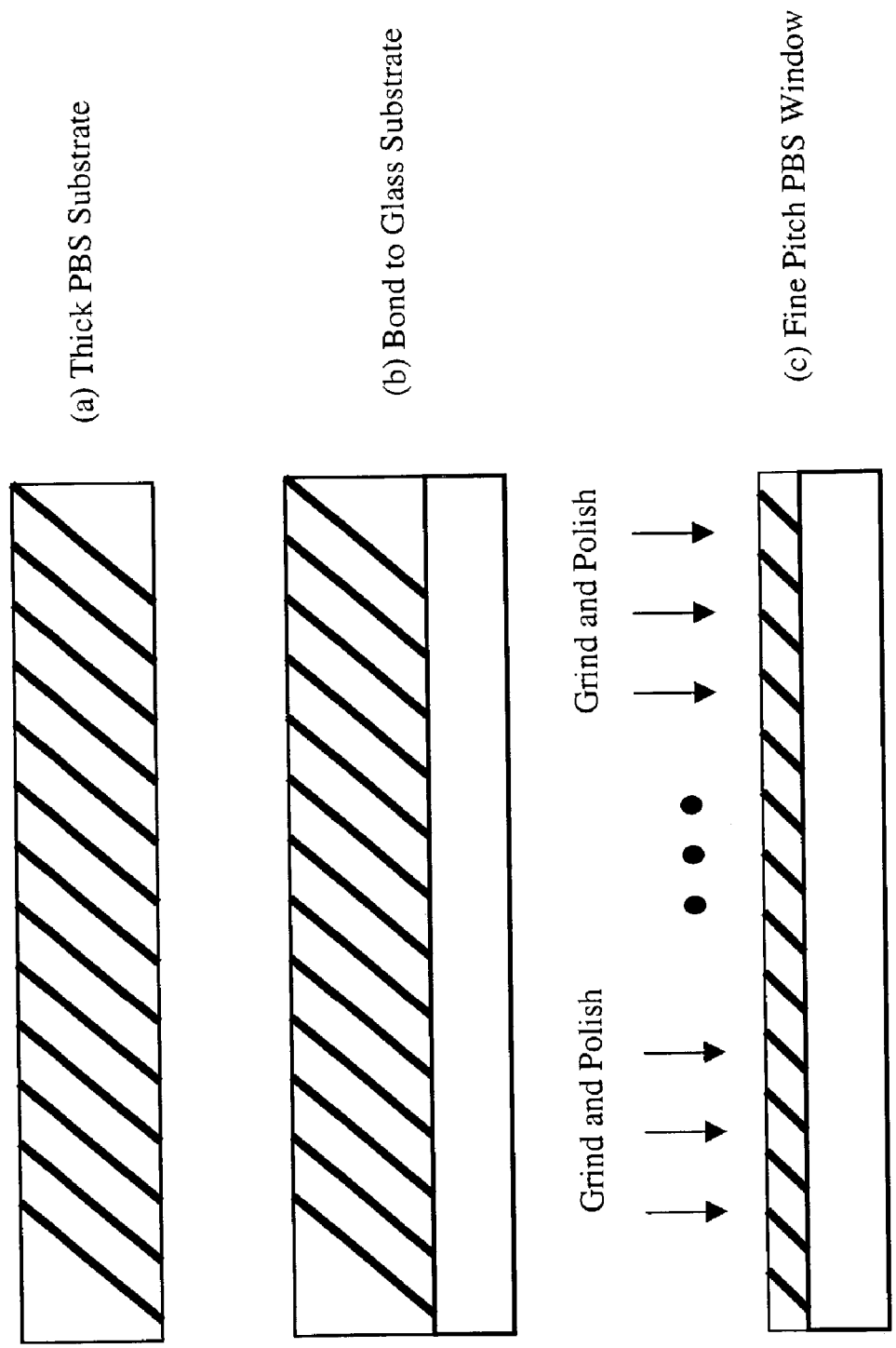
FIG. 12 illustrates a method of forming thin layers of polarization beam splitters.

FIG. 12 illustrates a method of fabricating fine pitch polarizing beam splitter window. For a fine pitch polarizing beam splitter window with closely space polarizing beam splitters, the thickness of polarizing beam splitter window should become very thin. However, the thin glass window can become very fragile and the stack & slice manufacturing method shown in FIGS. 3A–3B cannot effectively produce a very thin polarizing beam splitter window. To overcome this limitation, the following manufacturing process may be used. First, the stack & slice manufacturing method shown in FIGS. 3A–3B can be used to produce a thick polarizing beam splitter window, shown in FIG. 12(a). Then, the thick polarizing beam splitter window is bonded to a glass substrate as shown in FIG. 12(b). Prior to bonding, the appropriate surfaces of polarizing beam splitter window and glass substrate can be grinded, polished, and cleaned. Thereafter, the bonded structures are grinded and thinned from the polarizing beam splitter window side until the desired polarizing beam splitter window thickness is obtained (see FIG. 12(c)). The grind and polishing process ensures that the polarizing beam splitter window could provide sufficiently parallel and smooth surfaces with acceptable optical performance. It should be noted that all boundary surfaces of different refractive indices could be coated with antireflection materials in order to reduce back-reflections and to improve insertion losses.

Figure 13:
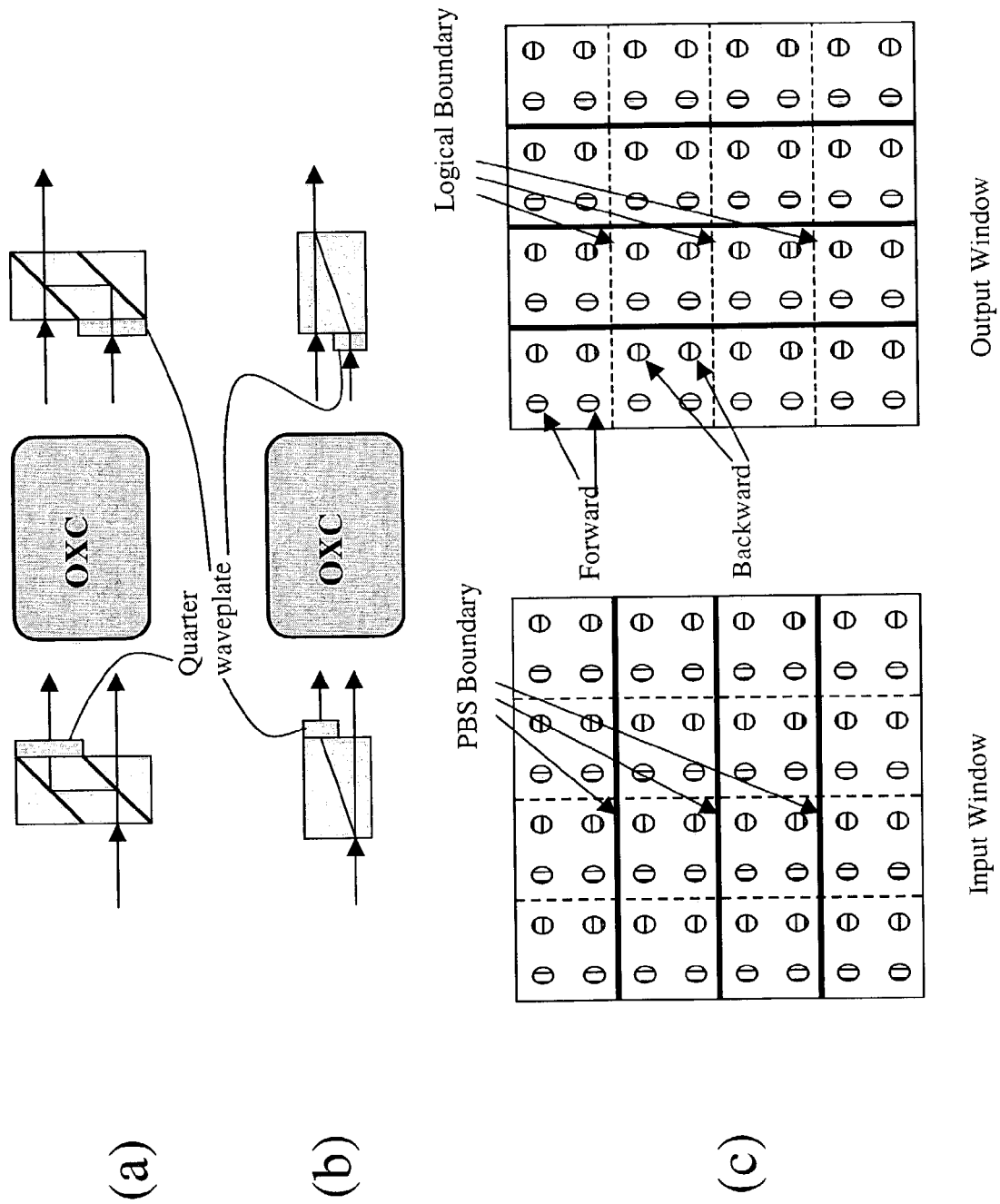
FIG. 13 illustrates a polarization diversity scheme for liquid crystal-based optical switches.

FIG. 13 shows a polarization diversity scheme needed for liquid crystal-based optical switches. The liquid crystal optical switches are sensitive to the polarization orientation of incoming optical signals. To overcome this polarization sensitivity, the optical signals entering the liquid crystal optical switches are first separated into two orthogonal and linearly polarized lights. After going through the liquid crystal optical switch stage, these polarized lights can be combined together. In FIGS. 13(a) and 13(b), three distinctive stages can be observed: 1) polarization beam splitter stage, 2) optical switching stage, and 3) polarization beam combiner stage. Both polarization beam splitter and combiner stages can utilize either walk-off birefringence crystal (FIG. 13(b)) or polarization beam splitter with a corner reflector (FIG. 13(a)). If one of the linearly polarized lights is allowed to go through a quarter waveplate to rotate the polarization axis about 90°, the optical switch can process the two linearly polarized lights simultaneously by using a single liquid crystal cell.

In FIG. 13(c), optical paths for polarization insensitive OXC is shown in a 2-D window configuration. The input window is a cutaway view of N-arrays of 1×N optical switches at its output port. The output window is the cutaway view of N-arrays of N×1 optical switches at its input port. The 1×N optical switch is configured in a vertical structure, while the N×1 optical switch is configured in a horizontal structure. The logical line in both input and output window defines the array boundaries for 1×N and N×1 optical switches. Within individual elements of input and output windows, there exist four optical beams. Here two forward optical beams are two independent linearly polarized lights propagating in forward direction. The two optical beams are separated at the polarization beam splitter stage and these can be recombined at the polarization beam combiner stage. The other two optical beams can be utilized as backward optical beams of two independent linearly polarized lights propagating in backward direction. The use of forward and backward optical beams within the OXC can allow a bi-directional operation of OXC by providing independent optical paths.

Figure 14:
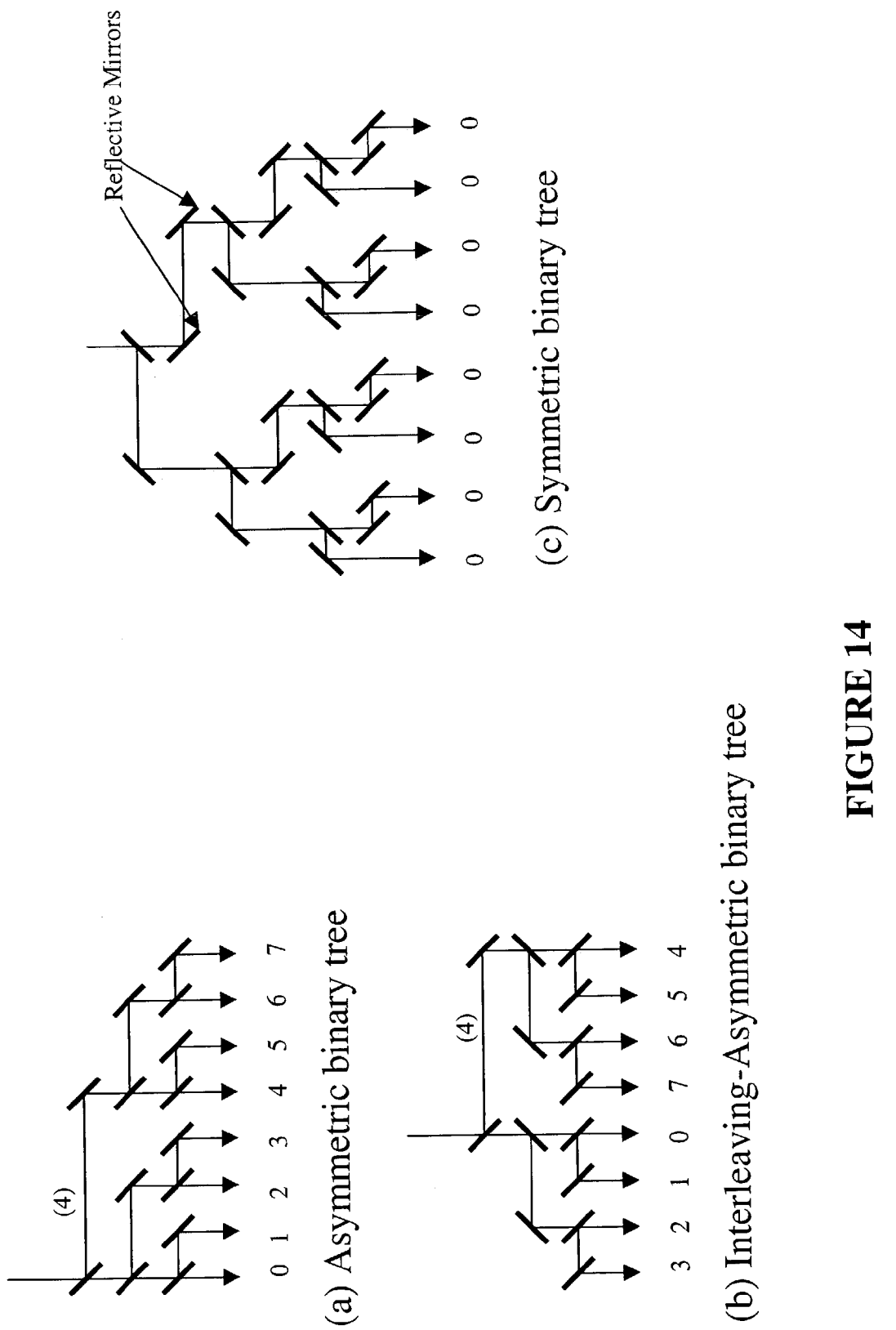
FIG. 14 shows alterative binary tree structures.

FIGS. 14A–C shows a various binary tree structures for 1×N optical switches. FIGS. 14(a), (b) and (c) illustrates asymmetric, quasi-symmetric, and symmetric binary tree configurations, respectively, for optical switches. The liquid crystal-based optical switches utilize fiber collimators at both input and output ports. As the fiber collimators have limited range of working distances, the overall optical path length of OXC should not exceed the maximum working distance of any fiber collimators being used. The 1×N or N×1 optical switches utilizing asymmetric binary tree results in a widely varying optical path length. In FIG. 14(a), the optical path length for the output port at the far right position needs seven units of additional optical path length compared to the one at the far left position. By rearranging the optical switch structures, one can obtain the quasi-symmetric binary tree structures as shown in FIG. 14(b). However, in order to reduce and equalize the optical path lengths, a symmetric binary tree structure of FIG. 14(c) may be used, incorporating additional reflecting mirror stages. Note that the optical path length is equalized for all output ports and the longest possible optical path length for the symmetrical binary tree is less than that of asymmetric one. The reflecting mirrors should be polarization insensitive. Optical mirrors with metallic coating can be utilized. There exist a variety of metallic materials-with varying reflectivity. The Table 1 summarizes the reflectivity of metals at both 1550 nm and 650 nm.

TABLE 1

Reflectivity of Metals

| Material | Reflectivity IR: 1550 nm | Reflectivity Visible: 650 nm |
| --- | --- | --- |
| Au | 0.993 | 0.953 |
| Ag | 0.987 | 0.944 |
| Al | 0.9778 | 0.943 |
| Cu | 0.976 | 0.943 |
| Ni | 0.794 | 0.659 |
| Pt | 0.762 | 0.678 |
| W | 0.710 | 0.518 |
| Cr | 0.680 | 0.644 |
| SC—Si | 0.306 | 0.345 |

Benefits of the present invention for OXC and methods of manufacturing OXC include:

Solid state switching reliability

High speed switching

Low voltage and low power consumption

Digital switching mechanism

Low insertion losses

Low polarization dependent losses

Wide operating spectral bandwidth

Use of mature and market-proven liquid crystal and polarization optics technologies Since the number of components are reduced as compared to componential systems, cost may be decreased and reliability may be increased. Particularly, since there are no optical fiber for cross-connect, and there are less discrete components, the present invention is a dramatic improvement over conventional optical cross connects. This is true since all of the components (polarization beam splitters, liquid crystal cell and conditioning apparatus), are all integrated into a monolithic structure having aligned windows. Alignment and assembly of the optical components is facilitated since there are less individual optical components to assembly, as compared to the present invention wherein the optical components are in window arrays.

Also, due to the window array structure, mass-manufacturablity is dramatically improved as well as the ability to scale the optical cross connect up to large N values as compared to systems using discrete components.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A 1XN optical connector for steering light comprising:

an (N−1)th stage including an (N−1)th stage liquid crystal cell having a first state for transmitting a first polarization component of the light and a second state for transmitting a second polarization component of the light;

an (N−1)th stage polarizing beam splitter structure superposed on the (N−1)th liquid crystal cell, the (N−1)th polarizing beam splitter structure comprising $2^{N-1}$ polarizing beam splitting elements reflecting the first polarization state and transmitting the second polarization state, the (N−1)th polarizing beam splitter elements being integrated within an (N−1)th substrate and oriented at an angle and in a direction;

an Nt stage including an Nt stage liquid crystal cell superposed on the (N−1)th polarizing beam splitter structure, Nth liquid crystal cell having a first state for transmitting a first polarization component of the light and a second state for transmitting a second polarization component of the light the Nth liquid crystal cell configured for receiving an input from the (N−1)th polarizing beam splitter; and an Nth stage polarizing beam splitter structure superposed on the Nth liquid crystal cell, the Nth polarizing beam splitter structure comprising $2^N$ polarizing beam splitting elements reflecting the first polarization state and transmitting the second polarization state, the Nth polarizing beam splitter elements being integrated within an Nth substrate and oriented at an angle and in a direction substantially similar to the angle and direction of the (N−1)th polarizing beam splitter elements, wherein N is an integer greater than or equal to 2.

2. An optical cross connect comprising a first 1XN optical connector of claim 1 wirelessly aligned with a second 1XN optical connector of claim 1 orthogonal to the first 1XN optical connector, the second 1XN optical connector reversed so that it is configured as an NX1 optical connector respective the first 1XN optical connector.

3. The optical cross connect as in claim 2, further comprising a conditioning window interposed between the first 1XN optical connector and the NX1optical connector.

* * * * *